(12) United States Patent
Lee et al.

(10) Patent No.: US 12,034,392 B2
(45) Date of Patent: Jul. 9, 2024

(54) APPARATUS AND METHOD FOR DRIVING MOTOR

(71) Applicants: Hyundai Motor Company, Seoul (KR); Kia Corporation, Seoul (KR); Seoul National University R&DB Foundation, Seoul (KR)

(72) Inventors: Yong Jae Lee, Yongin-Si (KR); Kang Ho Jeong, Hwaseong-Si (KR); Young Seul Lim, Seoul (KR); Jae Hoon Shim, Seoul (KR); Jung Ik Ha, Seoul (KR)

(73) Assignees: Hyundai Motor Company, Seoul (KR); Kia Corporation, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 184 days.

(21) Appl. No.: 17/861,493

(22) Filed: Jul. 11, 2022

(65) Prior Publication Data
US 2023/0073159 A1    Mar. 9, 2023

(30) Foreign Application Priority Data

Aug. 26, 2021   (KR) ......................... 10-2021-0113462

(51) Int. Cl.
  *H02P 27/08* (2006.01)
  *H02M 1/38* (2007.01)
  *H02M 7/5395* (2006.01)

(52) U.S. Cl.
  CPC .............. *H02P 27/08* (2013.01); *H02M 1/38* (2013.01); *H02M 7/5395* (2013.01)

(58) Field of Classification Search
  CPC .......... H02P 27/00; H02P 27/04; H02P 27/06; H02P 27/08; H02P 2101/45; H02P 6/06;
  (Continued)

(56) References Cited

U.S. PATENT DOCUMENTS

2009/0033253 A1    2/2009  Nagashima et al.
2019/0372501 A1*  12/2019  Wada .................... B62D 5/0403

FOREIGN PATENT DOCUMENTS

CN          109560744      4/2019
JP            6285256      2/2018
            (Continued)

*Primary Examiner* — Antony M Paul
(74) *Attorney, Agent, or Firm* — MORGAN, LEWIS & BOCKIUS LLP

(57) ABSTRACT

An apparatus configured for driving a motor, includes a first inverter including a first switching elements and connected to a first end of each of a windings respectively corresponding to a plurality of phases of the motor, a second inverter including a second switching elements and connected to a second end of each of the windings, a switches including first ends respectively connected to nodes to which the windings and the second switching elements are respectively connected and second ends connected to each other, and a controller configured to drive the motor in one of a first driving mode for driving the motor by maintaining the second switching elements in an open state and performing pulse width modulation control for the first switching elements and a second driving mode for driving the motor by performing pulse width modulation control for the first switching elements and the second switching elements.

20 Claims, 5 Drawing Sheets

(58) Field of Classification Search
CPC ...... H02P 6/08; H02P 1/04; H02P 1/16; H02P 1/24; H02P 1/26; H02P 21/00; H02P 21/14; H02P 21/22; H02P 23/00; H02P 23/07; H02P 25/00; H02P 25/086; H02P 25/107; H02P 25/22; H02P 29/024; H02P 29/028; H02P 3/22; B60L 2240/421; B60L 2240/423; B60L 3/003; B60L 3/0092; B60L 15/20; B60L 2220/58; B60L 15/007; H02K 11/33
See application file for complete search history.

(56) References Cited

FOREIGN PATENT DOCUMENTS

| | | |
|---|---|---|
| KR | 10-2021-0008974 | 1/2021 |
| WO | WO 2020/035926 | 2/2020 |

* cited by examiner

APPARATUS AND METHOD FOR DRIVING MOTOR

CROSS-REFERENCE TO RELATED APPLICATION

The present application claims priority to Korean Patent Application No. 10-2021-0113462, filed on Aug. 26, 2021, the entire contents of which is incorporated herein for all purposes by this reference.

BACKGROUND OF THE PRESENT DISCLOSURE

Field of the Present Disclosure

The present disclosure relates to an apparatus and method for driving a motor, and more specifically, to an apparatus and method for driving a motor which can curb various control impacts that occur during switching between a driving mode in which one inverter is used and a driving mode in which two inverters are used when a motor is driven using two inverters connected to both ends of each winding of the motor.

Description of Related Art

In general, one end of a winding of each phase included in a motor is connected to an inverter and the other ends of windings are connected to each other to form a Y connection.

When the motor is driven, a switching element in the inverter is turned ON/OFF according to pulse width modulation control and applies a phase-to-phase voltage to the Y-connected windings of the motor to generate an alternating current. As a result, torque is generated.

Since the fuel efficiency of eco-friendly vehicles such as electric vehicles that use torque generated by such a motor as power is determined by the power conversion efficiency of the inverter-motor, it is important to maximize the power conversion efficiency of the inverter and motor efficiency.

The efficiency of an inverter-motor system is determined mainly by the voltage utilization rate of an inverter. When the operating point of a vehicle determined by the relationship between motor speed and torque is formed in a section where the voltage utilization rate is high, the fuel efficiency of the vehicle may be improved.

However, as the number of windings of the motor is increased to increase the maximum torque of the motor, the section where the voltage utilization rate is high becomes far away from a low torque region which is a main operating point of the vehicle, and thus fuel efficiency may deteriorate. Furthermore, in the case of a design in which the section with a high voltage utilization rate includes a main operating point from the viewpoint of fuel efficiency, there is a limitation in the maximum torque of the motor, which may cause a problem that acceleration start performance of the vehicle deteriorates.

To solve such a problem, an open end winding (OEW) type motor driving technique of respectively connecting inverters to both ends of a winding of a motor and driving the two inverters instead of short-circuiting one end of a motor winding through a Y connection has been provided.

This open end winding type motor driving technique has the advantages of increasing a phase voltage to improve the voltage utilization rate and outputting high power as compared to a technique of driving a conventional Y-connected motor.

A motor driving apparatus configured for selectively using a motor driving mode of a Y-connection structure and a motor driving mode of open end winding has already been developed as described above. The motor driving apparatus using the two motor driving modes includes a plurality of switches configured for connecting one end of a winding of the motor to one end of another winding of the motor.

A motor having a Y connection at one end thereof may be driven by short-circuiting all switches and controlling a single inverter in the Y-connected motor driving mode, and a motor may be driven by opening all switches and controlling both inverters connected to both ends of each winding of the motor in the open winding type motor driving mode.

In such a motor driving apparatus, when switching between the Y-connected motor driving mode and the open end winding type motor driving mode is required while a motor is being driven, an inverter commonly connected to one end of a motor winding to which switches are connected operates in a short-circuited state of the switches, which may cause short-circuit of a DC link.

Furthermore, it is important not to cause control impact during switching between the Y-connected motor driving mode and the open end winding type motor driving mode while the motor is being driven from the viewpoint of software. Here, control impact may correspond to occurrence of fluctuations in torque, current, unintended control variables, and the like.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and method for driving a motor which can curb short-circuiting of a DC link and various control impacts that occur during switching between a driving mode in which a single inverter is used and a driving mode in which two inverters are used when a motor is driven using two inverters connected to both ends of each winding of the motor.

In accordance with an aspect of the present disclosure, the above and other objects may be accomplished by the provision of an apparatus configured for driving a motor, including a first inverter including a plurality of first switching elements and connected to a first end of each of windings respectively corresponding to a plurality of phases of the motor, a second inverter including a plurality of second switching elements and connected to a second end of each of the windings, a plurality of switches including first ends respectively connected to nodes to which the plurality of windings and the plurality of second switching elements are respectively connected and second ends connected to each other, and a controller configured to drive the motor in one of a first driving mode for driving the motor by maintaining the plurality of second switching elements in an open state and performing pulse width modulation control for the plurality of first switching elements and a second driving mode for driving the motor by performing pulse width modulation control for the plurality of first switching elements and the plurality of second switching elements and to apply a dead time in which a state in which all of the plurality of second switching elements and the plurality of switches are turned off is maintained for a preset time at a time of switching between the first driving mode and the second driving mode.

In various exemplary embodiments of the present disclosure, upon determining that switching from the first driving mode to the second driving mode is required in a first sampling period, the controller may be configured to control the plurality of switches to switch from an ON state to an OFF state at a time when a second sampling period subsequent to the first sampling period has elapsed and a third sampling period subsequent to the second sampling period starts and start pulse width modulation of the second switching elements when the dead time has elapsed after the plurality of switches is turned off.

In various exemplary embodiments of the present disclosure, the controller may perform arithmetic operations for executing the second driving mode in the second sampling period and perform pulse width modulation control for the second inverter using results obtained in the second sampling period in the third sampling period.

In various exemplary embodiments of the present disclosure, upon determining that switching from the first driving mode to the second driving mode is required in the first sampling period, the controller may apply a preset delay at a time when the second sampling period subsequent to the first sampling period has elapsed and the third sampling period subsequent to the second sampling period starts and then control the plurality of switches to switch from an ON state to an OFF state, and start pulse width modulation of the second switching elements when the dead time has elapsed after the plurality of switches is turned off.

In various exemplary embodiments of the present disclosure, the sum of a time interval corresponding to the delay and a time interval corresponding to the dead time may correspond to a time interval of one sampling period, and the controller may start pulse width modulation of the second switching elements at a time when a fourth sampling period subsequent to the third sampling period starts.

In various exemplary embodiments of the present disclosure, the controller may perform arithmetic operations for executing the second driving mode in the third sampling period and perform pulse width modulation control for the second inverter using results obtained in the third sampling period in the fourth sampling period.

In various exemplary embodiments of the present disclosure, upon determining that switching from the second driving mode to the first driving mode is required in the first sampling period, the controller may be configured to control the plurality of second switching elements to be turned off at a time when the second sampling period subsequent to the first sampling period has elapsed and the third sampling period subsequent to the second sampling period starts and control the plurality of switches to switch from an OFF state to an ON state when the dead time has elapsed after the plurality of second switching elements is turned off.

In various exemplary embodiments of the present disclosure, the controller may perform arithmetic operations for executing the first driving mode in the second sampling period and perform pulse width modulation control for the first inverter using results obtained in the second sampling period in the third sampling period.

In various exemplary embodiments of the present disclosure, upon determining that switching from the second driving mode to the first driving mode is required in the first sampling period, the controller may apply a preset delay at a time when the second sampling period subsequent to the first sampling period has elapsed and the third sampling period subsequent to the second sampling period starts and then control the plurality of second switching elements to be turned off, and control the plurality of switches to switch from an OFF state to an ON state when the dead time has elapsed after the plurality of second switching elements is turned off.

In various exemplary embodiments of the present disclosure, the sum of the time interval corresponding to the delay and the time interval corresponding to the dead time may correspond to the time interval of one sampling period, and the controller may be configured to control the plurality of switches to switch from an OFF state to an ON state at a time when the fourth sampling period following the third sampling period starts.

In various exemplary embodiments of the present disclosure, the controller may perform arithmetic operations for executing the first driving mode in the third sampling period and perform pulse width modulation control for the first inverter using results obtained in the third sampling period in the fourth sampling period.

In accordance with another aspect of the present disclosure, there is provided a method for driving a motor by the above-described apparatus configured for driving a motor, including determining, by the controller, that switching from the first driving mode to the second driving mode is required in a first sampling period, controlling, by the controller, the plurality of switches to switch from an ON state to an OFF state in one sampling period subsequent to the first sampling period, and starting pulse width modulation of the second switching elements when the dead time has elapsed after the plurality of switches is turned off.

In various exemplary embodiments of the present disclosure, the controlling of the plurality of switches to switch from an ON state to an OFF state may include controlling, by the controller, the plurality of switches to switch from an ON state to an OFF state at a time when a second sampling period subsequent to the first sampling period has elapsed and a third sampling period subsequent to the second sampling period starts.

In various exemplary embodiments of the present disclosure, the method may further include performing, by the controller, arithmetic operations for executing the second driving mode in the second sampling period, and the starting of pulse width modulation may include performing pulse width modulation control for the second inverter using results obtained in the second sampling period in the third sampling period.

In various exemplary embodiments of the present disclosure, the controlling of the plurality of switches to switch from an ON state to an OFF state may include, by the controller, applying a preset delay at a time when the second sampling period subsequent to the first sampling period has elapsed and the third sampling period subsequent to the second sampling period starts and then controlling the plurality of switches to switch from an ON state to an OFF state.

In various exemplary embodiments of the present disclosure, the sum of a time interval corresponding to the delay and a time interval corresponding to the dead time may correspond to a time interval of one sampling period, and the starting of pulse width modulation may include starting, by the controller, pulse width modulation of the second switching elements at a time when a fourth sampling period subsequent to the third sampling period starts.

In various exemplary embodiments of the present disclosure, the method may further include performing, by the controller, arithmetic operations for executing the second driving mode in the third sampling period, and the starting of pulse width modulation may include performing pulse width modulation control for the second inverter using results obtained in the third sampling period in the fourth sampling period.

In accordance with another aspect of the present disclosure, there is provided a method for driving a motor by the above-described apparatus configured for driving a motor, including determining, by the controller, that switching from the second driving mode to the first driving mode is required in a first sampling period, controlling, by the controller, the plurality of second switching elements to be turned off in one sampling period subsequent to the first sampling period, and controlling the plurality of switches to switch from an OFF state to an ON state when the dead time has elapsed after the plurality of switches is turned off.

In various exemplary embodiments of the present disclosure, the controlling of the plurality of second switching elements to be turned off may include controlling, by the controller, the plurality of second switching elements to be turned off at a time when a second sampling period subsequent to the first sampling period has elapsed and a third sampling period subsequent to the second sampling period starts.

In various exemplary embodiments of the present disclosure, the method may further include performing, by the controller, arithmetic operations for executing the first driving mode in the second sampling period, and the controlling of the plurality of switches from an OFF state to an ON state may include performing pulse width modulation control for the first inverter using results obtained in the second sampling period in the third sampling period.

In various exemplary embodiments of the present disclosure, the controlling of the plurality of second switching elements to be turned off may include, by the controller, applying a preset delay at a time when the second sampling period subsequent to the first sampling period has elapsed and the third sampling period subsequent to the second sampling period starts and then controlling the plurality of second switching elements to be turned off.

In various exemplary embodiments of the present disclosure, the sum of a time interval corresponding to the delay and a time interval corresponding to the dead time may correspond to a time interval of one sampling period, and the controlling of the plurality of switches to switch from an OFF state to an ON state may include controlling, by the controller, the plurality of switches to switch from an OFF state to an ON state at a time when a fourth sampling period subsequent to the third sampling period starts.

In various exemplary embodiments of the present disclosure, the method may further include performing, by the controller, arithmetic operations for executing the first driving mode in the third sampling period, and the controlling of the plurality of switches to switch from an OFF state to an ON state may include performing pulse width modulation control for the first inverter using results obtained in the third sampling period in the fourth sampling period.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
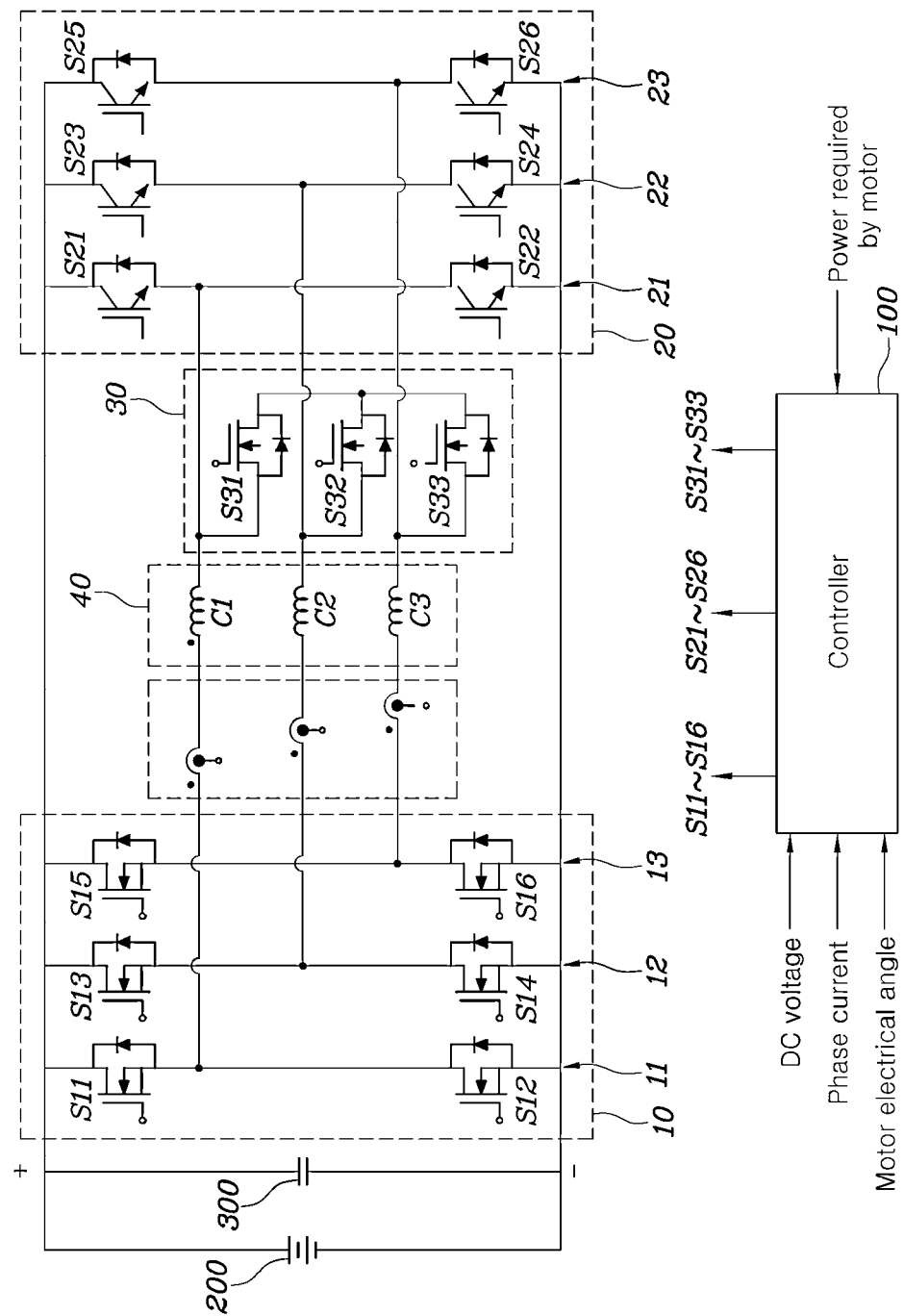
FIG. 1 is a circuit diagram of a motor driving apparatus according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a motor driving apparatus according to various embodiments of the present disclosure will be described in detail with reference to the accompanying drawings.

FIG. 1 is a circuit diagram of a motor driving apparatus according to various exemplary embodiments of the present disclosure.

Referring to FIG. 1, the motor driving apparatus according to various exemplary embodiments of the present disclosure may include a first inverter 10 including a plurality of first switching elements S11 to S16 and connected to first ends of windings C1 to C3 of a motor 40, a second inverter 20 including a plurality of second switching elements S21 to S26 and connected to second ends of the windings C1 to C3 of the motor 40, switches S31 to S33 including first ends respectively connected to nodes to which the second ends of the windings C1 to C3 and the second switching elements S21 to S26 are respectively connected and second ends connected to each other, and a controller 100 that controls switching states of the plurality of first switching elements S11 to S16, the plurality of second switching elements S21 to S26, and the switches S31 to S33 according to a driving mode of the first inverter 10 and the second inverter 20.

The first inverter 10 and the second inverter 20 may transform DC power stored in a battery 200 into three-phase AC power and provide the same to the motor 100 or transform regenerative breaking energy generated caused by generation of a regenerative braking torque of the motor 100 during regenerative braking into DC and provide the same to the battery 200. Such transformation between DC power and AC power may be performed by controlling pulse width modulation of the plurality of first switching elements S11 to S16 and the plurality of second switching elements S21 to S26 included in the first inverter 10 and the second inverter 20.

The first inverter 10 may include a plurality of legs 11 to 13 to which a DC voltage formed at a DC link capacitor 300 connected between both ends of the battery 200 is applied. The legs 11 to 13 may respectively correspond to the plurality of phases of the motor 40 to form an electrical connection.

The first leg 11 includes two switching elements S11 and S12 connected in series between both ends of the DC capacitor 300, and a connection node of the two switching elements S11 and S12 may be connected to one end of one winding C1 in the motor 40 so that AC power corresponding to one of the plurality of phases is input/output therethrough. Similarly, the second leg 12 includes two switching elements S13 and S14 connected in series between both ends of the DC capacitor 300, and a connection node of the two switching elements S13 and S14 may be connected to one end of one winding C2 in the motor 40 so that AC power corresponding to one of the plurality of phases is input/output therethrough. Furthermore, the third leg 13 includes two switching elements S15 and S16 connected in series between both ends of the DC capacitor 300, and a connection node of the two switching elements S15 and S16 may be connected to one end of one winding C3 in the motor 40 so that AC power corresponding to one of the plurality of phases is input/output therethrough.

The second inverter 20 may have a similar configuration to that of the first inverter 10. The second inverter 20 may include a plurality of legs 21 to 23 to which the DC voltage formed at the DC link capacitor 300 connected between both ends of the battery 200 is applied. The legs 21 to 23 may respectively correspond to the plurality of phases of the motor 40 to form an electrical connection.

The first leg 21 includes two switching elements S21 and S22 connected in series between both ends of the DC capacitor 300, and a connection node of the two switching elements S21 and S22 may be connected to the other end of one winding C1 in the motor 40 so that AC power corresponding to one of the plurality of phases is input/output therethrough. Similarly, the second leg 22 includes two switching elements S23 and S24 connected in series between both ends of the DC capacitor 300, and a connection node of the two switching elements S23 and S24 may be connected to the other end of one winding C2 in the motor 40 so that AC power corresponding to one of the plurality of phases is input/output therethrough. Furthermore, the third leg 23 includes two switching elements S25 and S26 connected in series between both ends of the DC capacitor 300, and a connection node of the two switching elements S25 and S26 may be connected to one end of one winding C3 in the motor 40 so that AC power corresponding to one of the plurality of phases is input/output therethrough.

Among the switching elements included in each of the inverters 10 and 20, a switching element connected to a high potential side (+ terminal) of the battery 200 is referred to as a top-phase switching element, and a switching element connected to a low potential side (− terminal) may be referred to as a bottom-phase switching element.

The first inverter 10 is connected to one end of each of the windings C1 to C3 of the motor 40 and the second inverter 20 is connected to the other end of each of the windings C1 to C3 of the motor 40. That is, open end winding type electrical connection in which both ends of the windings C1 to C3 of the motor 40 are connected to the first inverter 10 and the second inverter 20 may be formed.

In various exemplary embodiments of the present disclosure, a switch 30 for switching may include a total of three switching elements S31 to S33, and the first ends of the switches S31 to S33 may be respectively connected to the nodes to which the plurality of windings C1 to C3 and the second switching elements are respectively connected and the second ends of the switches S31 to S33 may be interconnected.

In the present connection structure, when the switch 30 is turned off (is in an open state), both ends of the windings C1, C2, and C3 of the motor 40 may be respectively connected to the first inverter 10 and the second inverter 20 to drive the motor 40 in an open end winding mode.

When the switch 30 is turned on (is in a short-circuited state), one-side ends of the windings C1 to C3 of the motor 40 are interconnected to form a Y-connection. In the instant case, the motor may be driven in a closed end winding mode by driving only the first inverter 10 without using the second inverter circuit 20.

High-power operation of the motor may be performed using the two inverters when the open end winding structure is applied, and high-efficiency operation of the motor may be performed by driving only the first inverter 10 employing a high-efficiency switching element (e.g., Sic) in the closed end winding structure.

As the switches S31 to S33, various switching means known in the art, such as a MOSFET and an IGBT, may be employed.

The controller 100 may drive the inverters 10 and 20 based on power required by the motor, input from the outside. For example, the controller 100 may generate a motor current command based on power required by the motor, input from an external element such as a host controller, receive feedback of a motor phase current actually provided to the motor, compare the motor phase current with the motor current command to generate a voltage command that can cancel an error therebetween, and determine a switching duty for pulse width modulation control of the switching elements S11 to S16 and S21 to S26 in the inverters 10 and 20 based on a DC voltage and the voltage command applied to the inverters. The controller 100 may receive an input of a rotation angle (motor angle) of the motor to perform coordinate transformation required in a process of controlling the inverters.

With respect to features of various embodiments of the present disclosure, the controller 100 may determine an operating mode of the inverters. For example, the controller 100 may determine a closed end winding mode in which the motor 40 is driven using only one inverter as a driving mode of the motor 400 when power required by the motor, input from the outside, is less than a predetermined reference value. Conversely, the controller 100 may determine an open end winding mode in which both inverters are used to drive the motor 40 as a driving mode of the motor 40 when the power required by the motor, input from the outside, is greater than the predetermined reference value.

The following table shows switching states in driving modes of the motor based on the short-circuited/open states of the switching elements and the switch 30 included in the first inverter 10 and the second inverter 20.

TABLE

|  | CEW mode | OEW mode | State during switching |
|---|---|---|---|
| First inverter | ON | ON | ON |
| Second inverter | OFF | ON | OFF |
| Switch | ON | OFF | OFF |

As shown in the table above, when the motor 40 is driven in the closed end winding (CEW) mode, the first switching elements S11 to S16 in the first inverter 10 may be in an ON state. That the first switching elements S11 to S16 may be in an ON state while driving of the motor 40 may be understood as meaning that the first switching elements S11 to S16 may be in an ON state according to switching by pulse width modulation control. Furthermore, all the second switching elements S21 to S26 in the second inverter 20 need to be in an OFF state and all the switches S31 to S33 need to be maintained in an ON state.

When the motor 40 is driven in the open end winding (OEW) mode, the first switching elements S11 to S16 in the first inverter 10 and the second switching elements S21 to S26 in the second inverter 20 may be in an ON state according to switching by pulse width modulation control and all the switches S31 to S33 need to be maintained in an OFF state.

Meanwhile, the state during switching in the table means a state in which all the second switching elements S21 to S26 in the second inverter 20 and the switches S31 to S33 are turned off in a state in which pulse width modulation control for the first switching elements S11 to S16 in the first inverter 10 is performed. The present state during switching is for preventing short-circuiting of the DC link which may occur in a state in which all the second switching elements S21 to S26 in the second inverter 20 and the switches S31 to S33 are turned on during switching between the open end winding mode and the closed end winding mode and may be maintained for a very short time period at the time of switching between driving modes.

Each driving mode of the motor 40 needs to maintain one control mode during a sampling period (or a control period) when digitally controlled discrete control is performed. This is since the voltage applied to the motor 40 must match the voltage of each inverter. When driving modes of the motor 40 are switched, the state during switching described above may occur for a very short time interval at the beginning of one sampling period or immediately before the end of one sampling period.

After all, switch control in the state during switching corresponds to a dead time that occurs for a very short time period during mode switching. Although which of the switches and the second switching elements of the second inverter is turned off first is determined according to a mode switching state, that is, whether driving modes switch from the closed end winding mode to the open end winding mode or switch from the open end winding to the closed end winding mode, the present disclosure has a feature that the controller 100 generates a period in which all the switches and the second switching elements of the second inverter are turned off while driving mode switching.

Hereinafter, a more specific switching control method will be described. In the following description, a mode switching method performed in the controller 100 will be described in chronological order with reference to the accompanying drawings. A motor driving method according to an exemplary embodiment of various embodiments of the present disclosure relates to a method of switching a motor driving mode performed by a controller and may be clearly understood by the drawings referred to in the following description. Accordingly, additional description of the motor driving method according to various exemplary embodiments of the present disclosure will be omitted.

Figure 2:
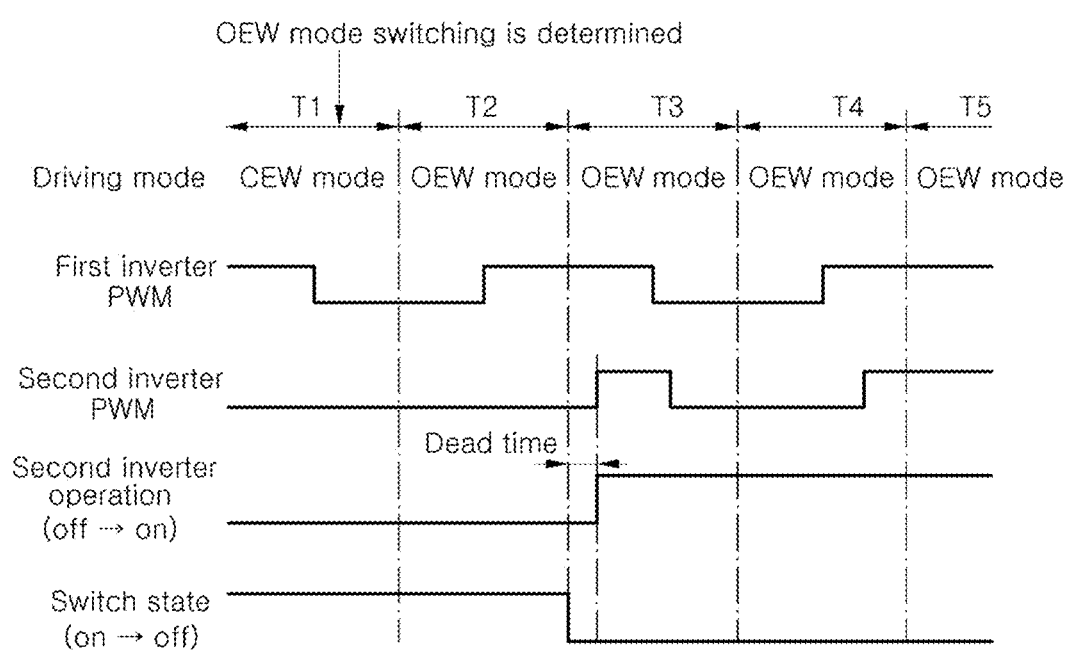
FIG. 2 is a timing diagram showing an example of a method of controlling mode switching from a closed end winding mode to an open end winding mode performed by a controller in an apparatus and method for driving a motor according to various exemplary embodiments of the present disclosure.

FIG. 2 is a timing diagram showing an example of a method of controlling switching from the closed end winding mode to the open end winding mode performed by a controller in an apparatus and method for driving a motor according to various exemplary embodiments of the present disclosure.

FIG. 2 illustrates a case in which it is determined that mode switching to the open end winding mode needs to be performed in the sampling period T1 while the controller 100 is performing control in the closed end winding mode, that is, in the mode in which the first inverter 10 is activated and thus pulse width modulation control for the first switching elements S11 to S16 is performed, and the second inverter 20 is deactivated and thus all the second switching elements S21 to S26 are turned off and the switches S31 to S33 are turned on.

In the sampling period T1, the controller may perform various arithmetic operations for the closed end winding mode and actually control the motor in the next sampling period T2 based on results obtained in the sampling period T1. That is, since the motor is controlled according to the results obtained in the sampling period T1 in the sampling period T2, the motor may still be driven in the closed end winding mode in the sampling period T2.

Meanwhile, since mode switching to the open end winding mode has been determined, arithmetic operations for driving the motor in the open end winding mode may be performed in the sampling period T2. For example, the controller may perform only determination of a duty for pulse width modulation control of the first switching elements S11 to S16 in the sampling period T1 because the motor is in the driving mode in which only the first inverter 10 is activated but may perform determination of duties of the first switching elements S11 to S16 and the second switching elements S21 to S26 for driving the motor in the open end winding mode in which the first inverter 10 and the second inverter 20 are used together to drive the motor in the sampling period T2.

Subsequently, the controller 100 may turn off the switches S31 to S33 when the subsequent sampling period T3 starts and then activate the second inverter 20 to perform pulse width modulation control on the second switching elements S21 to S26 when a preset dead time has elapsed. Here, the time at which the switches S31 to S33 are turned off may be a time after a slight delay from the start of the sampling period T3.

A switch state corresponding to the state during switching shown in the above table occurs for the time interval corresponding to the preset dead time. That is, the state during switching in which all of the second switching elements S21 to S26 of the second inverter 20 and the switches S31 to S33 are maintained in an OFF state occurs for the dead time.

Although the dead time is shown to be long in FIG. 2 to aid in understanding the present disclosure, the dead time may be set to be shorter than the sampling period so that errors with respect to various factors caused by the dead time may be ignored when the dead time is actually applied to the motor.

According to the example of FIG. 2, the motor 40 may operate in the closed end winding mode until the sampling period T2 ends and operate in the open end winding mode from the sampling period T3.

Figure 3:
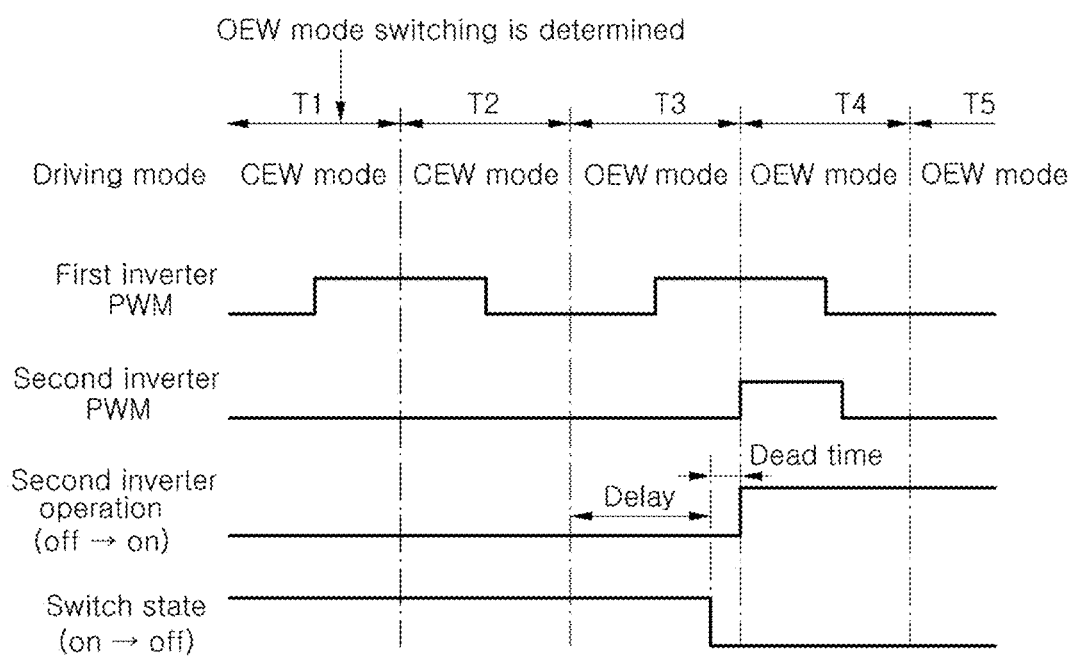
FIG. 3 is a timing diagram showing another example of the method of controlling mode switching from the closed end winding mode to the open end winding mode performed by the controller in the apparatus and method for driving a motor according to various exemplary embodiments of the present disclosure.

FIG. 3 is a timing diagram showing another example of the method of controlling mode switching from the closed end winding mode to the open end winding mode performed by the controller in the apparatus and method for driving a motor according to various exemplary embodiments of the present disclosure.

Similarly to FIG. 2, FIG. 3 illustrates a case in which it is determined that mode switching to the open end winding mode needs to be performed in the sampling period T1 while the controller 100 is performing control in the closed end winding mode, that is, in the mode in which the first inverter 10 is activated and thus pulse width modulation control for the first switching elements S11 to S16 is performed, and the second inverter 20 is deactivated and thus all the second switching elements S21 to S26 are turned off and the switches S31 to S33 are turned on.

In the sampling period T1, the controller may perform various arithmetic operations for the closed end winding mode and actually control the motor in the next sampling period T2 based on results obtained in the sampling period T1. That is, since the motor is controlled according to the results obtained in the sampling period T1 in the sampling period T2, the motor may still be driven in the closed end winding mode in the sampling period T2.

Meanwhile, since mode switching to the open end winding mode has been determined, arithmetic operations for driving the motor in the closed end winding mode may be performed in the sampling period T2 and then arithmetic operations for driving the motor in the open end winding mode in the subsequent sampling period T3. For example, the controller may perform only determination of a duty for pulse width modulation control of the first switching elements S11 to S16 in the sampling periods T1 and T2 since the motor is in the driving mode in which only the first inverter 10 is activated and may perform determination of duties of the first switching elements S11 to S16 and the second switching elements S21 to S26 for driving the motor in the open end winding mode in which the first inverter 10 and the second inverter 20 are used together to drive the motor in the sampling period T3.

Accordingly, the controller 100 turns off the switches S31 to S33 after applying a delay shorter than one sampling period when the subsequent sampling period T3 starts, and then activates the second inverter 20 to perform pulse width modulation control on the second switching elements S21 to S26 when a preset dead time has elapsed. Here, the sum of the time corresponding to the delay and the dead time may be set to correspond to one sampling time so that the time at which the second inverter 20 is activated and pulse width modulation control for the second switching elements S21 to S26 is started can substantially coincide with the start of a sampling period T4.

A switch state corresponding to the state during switching shown in the above table occurs for the time interval corresponding to the preset dead time. That is, the state during switching in which all of the second switching elements S21 to S26 of the second inverter 20 and the switches S31 to S33 are maintained in an OFF state occurs for the dead time.

As illustrated in FIG. 2, although the dead time is shown to be long in FIG. 3 to aid in understanding of the present disclosure, the dead time may be set to be shorter than the sampling period so that errors with respect to various factors caused by the dead time may be ignored when the dead time is actually applied to the motor.

According to the example of FIG. 3, the motor 40 may operate in the closed end winding mode until the sampling period T3 ends and operate in the open end winding mode from the sampling period T4.

As described above with reference to FIG. 2 and FIG. 3, the apparatus and method for driving a motor according to various exemplary embodiments of the present disclosure can prevent operation errors or failures due to short-circuiting of a DC link and impacts in software control which may occur during mode switching by providing a dead time corresponding to a state during switching in which all the second switching elements S21 to S26 of the second inverter 20 and the switches S31 to S33 are turned off at the time of switching from the closed end winding mode to the open end winding mode.

Figure 4:
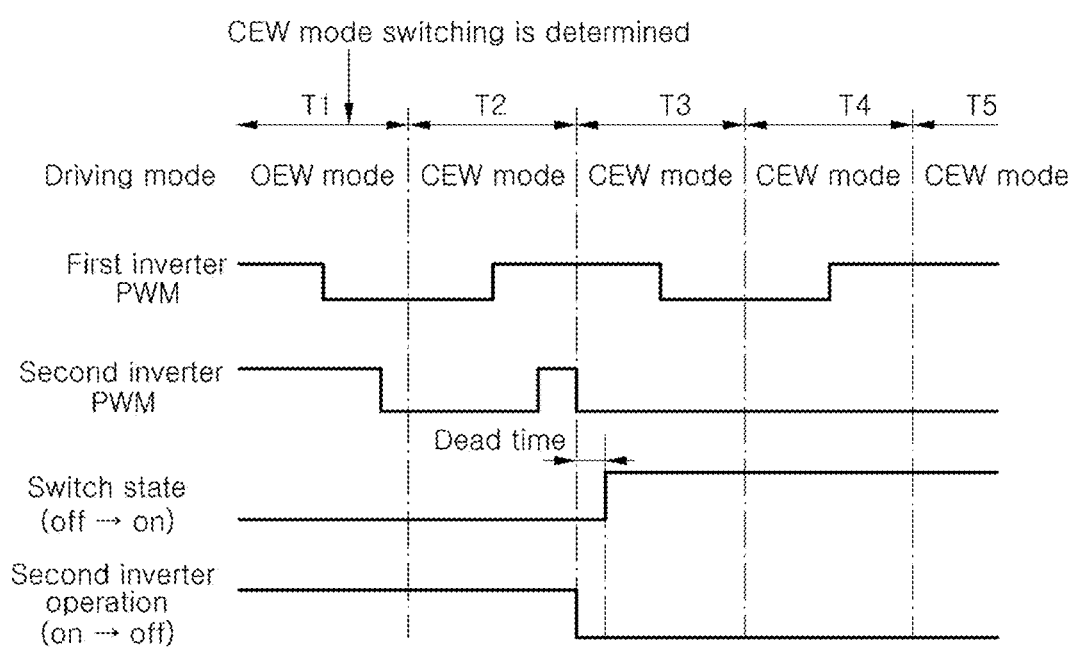
FIG. 4 is a timing diagram showing an example of a method of controlling mode switching from the open end winding mode to the closed end winding mode performed by the controller in the apparatus and method for driving a motor according to various exemplary embodiments of the present disclosure.

FIG. 4 is a timing diagram showing an example of a method of controlling mode switching from the open end winding mode to the closed end winding mode performed by the controller in the apparatus and method for driving a motor according to various exemplary embodiments of the present disclosure.

FIG. 4 illustrates a case in which it is determined that mode switching to the closed end winding mode needs to be performed in the sampling period T1 while the controller 100 is performing control in the open end winding mode, that is, in the mode in which the first inverter 10 and the second inverter 20 are activated and thus pulse width modulation control for the first switching elements S11 to S16 and the second switching elements S21 to S26 is performed and the switches S31 to S33 are turned off.

In the sampling period T1, the controller may perform various arithmetic operations for the open end winding mode and actually control the motor in the next sampling period T2 based on results obtained in the sampling period T1. That is, since the motor is controlled according to the results obtained in the sampling period T1 in the sampling period T2, the motor may still be driven in the open end winding mode in the sampling period T2.

Meanwhile, since mode switching to the closed end winding mode has been determined, the controller may perform arithmetic operations for driving the motor in the closed end winding mode in the sampling period T2. For example, the controller may perform determination of duties for pulse width modulation control of the first switching elements S11 to S16 and the second switching elements S21 to S26 in the sampling period T1 because the motor is in the driving mode in which both the first inverter 10 and the second inverter 230 are activated but may perform only determination of a duty of the first switching elements S11 to S16 for driving the motor using only the first inverter 10 in the sampling period T2.

Subsequently, the controller 100 may deactivate the second inverter 20 to turn off the second switching elements S21 to S26 when the subsequent sampling period T3 starts and then control the switches S31 to S33 to be turned on when a preset dead time has elapsed. Here, the time at which the second switching elements S21 to S26 are turned off may be a time after a slight delay from the start of the sampling period T3.

A switch state corresponding to the state during switching shown in the above table occurs for the time interval corresponding to the preset dead time. That is, the state during switching in which all of the second switching elements S21 to S26 of the second inverter 20 and the switches S31 to S33 are maintained in an OFF state occurs for the dead time.

Although the dead time is shown as being long in FIG. 4 to aid in understanding of the present disclosure, the dead time may be set to be shorter than the sampling period so that errors with respect to various factors caused by the dead time may be ignored when the dead time is actually applied to the motor.

According to the example of FIG. 4, the motor 40 may operate in the open end winding mode until the sampling period T2 ends and operate in the closed end winding mode from the sampling period T3.

Figure 5:
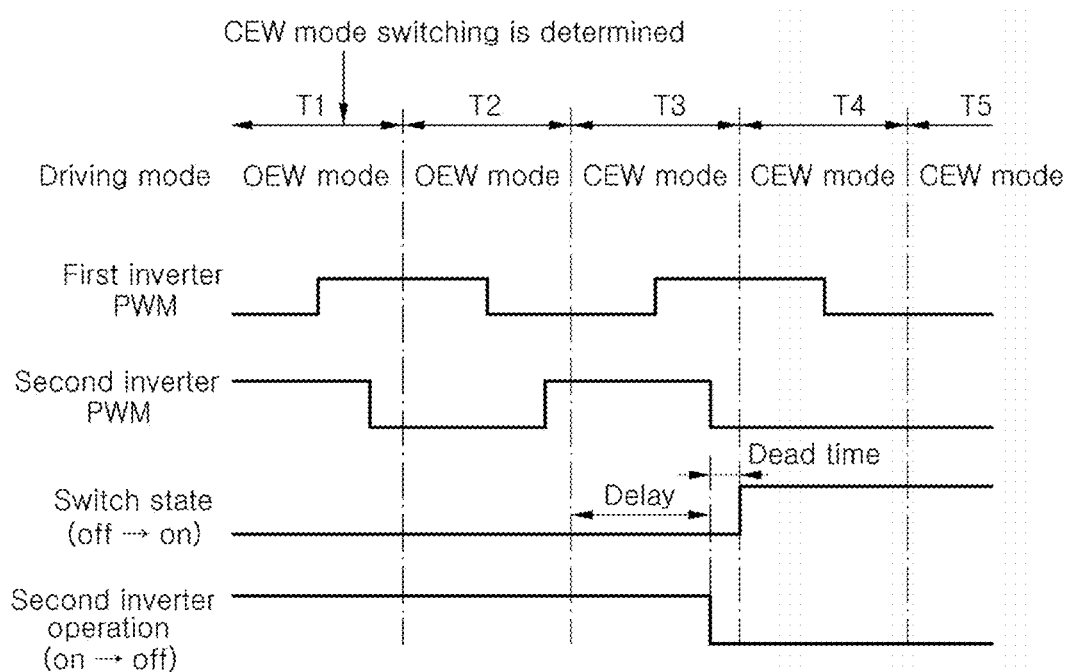
FIG. 5 is a timing diagram showing another example of the method of controlling mode switching from the open end winding mode to the closed end winding mode performed by the controller in the apparatus and method for driving a motor according to various exemplary embodiments of the present disclosure.

FIG. 5 is a timing diagram showing another example of the method of controlling mode switching from the open end winding mode to the closed end winding mode performed by the controller in the apparatus and method for driving a motor according to various exemplary embodiments of the present disclosure.

Similarly to FIG. 4, FIG. 5 illustrates a case in which it is determined that mode switching to the closed end winding mode needs to be performed in the sampling period T1 while the controller 100 is performing control in the open end winding mode, that is, in the mode in which the first inverter 10 and the second inverter 20 are activated and thus pulse width modulation control for the first switching elements S11 to S16 and the second switching elements S21 to S26 is performed and the switches S31 to S33 are turned off.

In the sampling period T1, the controller may perform various arithmetic operations for the open end winding mode and actually control the motor in the next sampling period T2 based on results obtained in the sampling period T1. That is, since the motor is controlled according to the results obtained in the sampling period T1 in the sampling period T2, the motor may still be driven in the open end winding mode in the sampling period T2.

Meanwhile, since mode switching to the open end winding mode has been determined, arithmetic operations for driving the motor in the open end winding mode may be performed in the sampling period T2 and then arithmetic operations for driving the motor in the closed end winding mode may be performed in the subsequent sampling period T3. For example, the controller may perform determination of duties for pulse width modulation control of the first switching elements S11 to S16 and the second switching elements S21 to S26 in the sampling periods T1 and T2 because the motor is in the driving mode in which both the first inverter 10 and the second inverter 20 are activated and may perform determination of a duty of the first switching elements S11 to S16 for driving the motor in the closed end winding mode in which the motor is driven using only the first inverter 10 in the sampling period T3.

Subsequently, the controller 100 may apply a delay shorter than one sampling period and then control the second switching elements S21 to S26 to be turned off so that the second inverter 20 is deactivated when the subsequent sampling period T3 starts. Furthermore, the controller 100 may turn on the switches S31 to S33 when a preset dead time has elapsed after deactivation of the second inverter 20. Here, the sum of the time corresponding to the delay and the dead time may be set to correspond to one sampling time so that the time at which the switches S31 to S33 are controlled to be turned on can substantially coincide with the start of a sampling period T4.

A switch state corresponding to the state during switching shown in the above table occurs for the time interval corresponding to the preset dead time. That is, the state during switching in which all of the second switching elements S21 to S26 of the second inverter 20 and the switches S31 to S33 are maintained in an OFF state occurs for the dead time.

As illustrated in FIG. 4, although the dead time is shown as being long in FIG. 5 to aid in understanding of the present disclosure, the dead time may be set to be shorter than the sampling period so that errors with respect to various factors caused by the dead time may be ignored when the dead time is actually applied to the motor.

According to the example of FIG. 5, the motor 40 may operate in the open end winding mode until the sampling period T3 ends and operate in the closed end winding mode from the sampling period T4.

As described above with reference to FIG. 4 and FIG. 5, the apparatus and method for driving a motor according to various exemplary embodiments of the present disclosure can prevent operation errors or failures due to short-circuiting of a DC link and impacts in software control which may occur during mode switching by providing a dead time corresponding to a state during switching in which all the second switching elements S21 to S26 of the second inverter 20 and the switches S31 to S33 are turned off at the time of switching from the open end winding mode to the closed end winding mode.

According to the apparatus and method for driving motor, it is possible to prevent operation errors or failures due to short-circuiting of a DC link and impacts in software control which may occur during mode switching by providing a dead time in which all switching elements in inverters switching between an activated state and a deactivated state and switches are turned off at the time of switching from the closed end winding mode in which the motor is being driven to the open end winding mode or switching from the open end winding mode in which the motor is being driven to the closed end winding mode.

Accordingly, according to the apparatus and method for driving a motor, it is possible to stably drive the motor in hardware and software in a motor driving technique in which two inverters are connected to both ends of each winding of the motor to drive the motor.

The effects which may be obtained in an exemplary embodiment of the present disclosure are not limited to the above-mentioned effects, and other effects that are not mentioned may be clearly understood by those of ordinary skill in the art from the following description.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for driving a motor, the apparatus comprising:
   a first inverter including a plurality of first switching elements and connected to a first end of each of windings respectively corresponding to a plurality of phases of the motor;
   a second inverter including a plurality of second switching elements and connected to a second end of each of the windings;
   a plurality of switches including first ends respectively connected to nodes to which the plurality of windings and the plurality of second switching elements are respectively connected and second ends connected to each other; and
   a controller configured to drive the motor in one of a first driving mode for driving the motor by maintaining the plurality of second switching elements in an open state and performing pulse width modulation control for the plurality of first switching elements and a second driving mode for driving the motor by performing pulse width modulation control for the plurality of first switching elements and the plurality of second switching elements and to apply a dead time in which a state in which all of the plurality of second switching elements and the plurality of switches are turned off is maintained for a preset time at a time of switching between the first driving mode and the second driving mode.

2. The apparatus of claim 1, wherein, upon determining that switching from the first driving mode to the second driving mode is required in a first sampling period, the controller is configured to control the plurality of switches to switch from an ON state to an OFF state at a time when a second sampling period subsequent to the first sampling period has elapsed and a third sampling period subsequent to the second sampling period starts and to start pulse width modulation of the second switching elements when the dead time has elapsed after the plurality of switches is turned off.

3. The apparatus of claim 1, wherein the controller is configured to perform arithmetic operations for executing the second driving mode in a second sampling period and to perform pulse width modulation control for the second inverter using results obtained in the second sampling period in a third sampling period.

4. The apparatus of claim 1, wherein, upon determining that switching from the first driving mode to the second driving mode is required in a first sampling period, the controller is configured to apply a preset delay at a time when a second sampling period subsequent to the first sampling period has elapsed and a third sampling period subsequent to the second sampling period starts and then controls the plurality of switches to switch from an ON state to an OFF state, and starts pulse width modulation of the second switching elements when the dead time has elapsed after the plurality of switches is turned off.

5. The apparatus of claim 4, wherein a sum of a time interval corresponding to the delay and a time interval corresponding to the dead time corresponds to a time interval of one sampling period, and
wherein the controller is configured to:
start pulse width modulation of the second switching elements at a time when a fourth sampling period subsequent to the third sampling period starts,
perform arithmetic operations for executing the second driving mode in the third sampling period and
perform pulse width modulation control for the second inverter using results obtained in the third sampling period in the fourth sampling period.

6. The apparatus of claim 1, wherein, upon determining that switching from the second driving mode to the first driving mode is required in a first sampling period, the controller is configured to:
control the plurality of second switching elements to be turned off at a time when a second sampling period subsequent to the first sampling period has elapsed and a third sampling period subsequent to the second sampling period starts,
control the plurality of switches to switch from an OFF state to an ON state when the dead time has elapsed after the plurality of second switching elements is turned off and
perform arithmetic operations for executing the first driving mode in the second sampling period and to perform pulse width modulation control for the first inverter using results obtained in the second sampling period in the third sampling period.

7. The apparatus of claim 1, wherein, upon determining that switching from the second driving mode to the first driving mode is required in the first sampling period, the controller is configured to apply a preset delay at the time when the second sampling period subsequent to the first sampling period has elapsed and the third sampling period subsequent to the second sampling period starts and then controls the plurality of second switching elements to be turned off, and controls the plurality of switches to switch from an OFF state to an ON state when the dead time has elapsed after the plurality of second switching elements is turned off.

8. The apparatus of claim 7, wherein a sum of a time interval corresponding to the delay and a time interval corresponding to the dead time corresponds to a time interval of one sampling period, and the controller is configured to control the plurality of switches to switch from an OFF state to an ON state at a time when a fourth sampling period following the third sampling period starts.

9. The apparatus of claim 8, wherein the controller is configured to perform arithmetic operations for executing the first driving mode in the third sampling period and to perform pulse width modulation control for the first inverter using results obtained in the third sampling period in the fourth sampling period.

10. A method for driving the motor by the apparatus configured for driving the motor of claim 1, the method including:
determining, by the controller, that switching from the first driving mode to the second driving mode is required in a first sampling period;
controlling, by the controller, the plurality of switches to switch from an ON state to an OFF state in one sampling period subsequent to the first sampling period; and
starting pulse width modulation of the second switching elements when the dead time has elapsed after the plurality of switches is turned off.

11. The method of claim 10, wherein the controlling of the plurality of switches to switch from an ON state to an OFF state includes:
performing, by the controller, arithmetic operations for executing the second driving mode in the second sampling period subsequent to the first sampling period; and
controlling, by the controller, the plurality of switches to switch from an ON state to an OFF state at a time when the second sampling period has elapsed and a third sampling period subsequent to the second sampling period starts,
wherein the starting of pulse width modulation includes performing pulse width modulation control for the second inverter using results obtained in the second sampling period in the third sampling period.

12. The method of claim 11, wherein the controlling of the plurality of switches to switch from an ON state to an OFF state includes:
applying, by the controller, a preset delay at a time when a second sampling period subsequent to the first sampling period has elapsed and a third sampling period subsequent to the second sampling period starts and then controlling the plurality of switches to switch from an ON state to an OFF state.

13. The method of claim 12,
wherein a sum of a time interval corresponding to the delay and a time interval corresponding to the dead time corresponds to a time interval of one sampling period, and
wherein the starting of pulse width modulation includes:
starting, by the controller, pulse width modulation of the second switching elements at a time when a fourth sampling period subsequent to the third sampling period starts.

14. The method of claim 13, further including:
performing, by the controller, arithmetic operations for executing the second driving mode in the third sampling period,
wherein the starting of pulse width modulation includes performing pulse width modulation control for the second inverter using results obtained in the third sampling period in the fourth sampling period.

15. A method for driving the motor by the apparatus configured for driving the motor of claim 1, the method including:
determining, by the controller, that switching from the second driving mode to the first driving mode is required in a first sampling period;
controlling, by the controller, the plurality of second switching elements to be turned off in one sampling period subsequent to the first sampling period; and
controlling, by the controller, the plurality of switches to switch from an OFF state to an ON state when the dead time has elapsed after the plurality of switches is turned off.

16. The method of claim 15, wherein the controlling of the plurality of second switching elements to be turned off includes:
controlling, by the controller, the plurality of second switching elements to be turned off at a time when a second sampling period subsequent to the first sampling period has elapsed and a third sampling period subsequent to the second sampling period starts.

17. The method of claim 16, further including:

performing, by the controller, arithmetic operations for executing the first driving mode in the second sampling period, wherein the controlling of the plurality of switches from an OFF state to an ON state includes performing pulse width modulation control for the first inverter using results obtained in the second sampling period in the third sampling period.

18. The method of claim 15, wherein the controlling of the plurality of second switching elements to be turned off includes:

applying, by the controller, a preset delay at a time when a second sampling period subsequent to the first sampling period has elapsed and a third sampling period subsequent to the second sampling period starts and then controlling the plurality of second switching elements to be turned off.

19. The method of claim 18, wherein a sum of a time interval corresponding to the delay and a time interval corresponding to the dead time corresponds to a time interval of one sampling period, and wherein the controlling of the plurality of switches to switch from an OFF state to an ON state includes:

controlling, by the controller, the plurality of switches to switch from an OFF state to an ON state at a time when a fourth sampling period subsequent to the third sampling period starts.

20. The method of claim 19, further including:

performing, by the controller, arithmetic operations for executing the first driving mode in the third sampling period, wherein the controlling of the plurality of switches to switch from an OFF state to an ON state includes performing pulse width modulation control for the first inverter using results obtained in the third sampling period in the fourth sampling period.

* * * * *